US009806532B2

(12) United States Patent
Ergin et al.

(10) Patent No.: US 9,806,532 B2
(45) Date of Patent: Oct. 31, 2017

(54) METHOD FOR SWITCHING AN OPERATING CURRENT

(71) Applicant: SIEMENS AKTIENGESELLSCHAFT, Munich (DE)

(72) Inventors: Dominik Ergin, Baiersdorf (DE); Hans-Joachim Knaak, Erlangen (DE); Andreas Philipp, Winkelhaid (DE)

(73) Assignee: Siemens Aktiengesellschaft, Munich (DE)

( * ) Notice: Subject to any disclaimer, the term of this patent is extended or adjusted under 35 U.S.C. 154(b) by 206 days.

(21) Appl. No.: 14/769,547

(22) PCT Filed: Feb. 22, 2013

(86) PCT No.: PCT/EP2013/053596
§ 371 (c)(1),
(2) Date: Aug. 21, 2015

(87) PCT Pub. No.: WO2014/127830
PCT Pub. Date: Aug. 28, 2014

(65) Prior Publication Data
US 2016/0006258 A1 Jan. 7, 2016

(51) Int. Cl.
*H02J 1/10* (2006.01)
*H02J 5/00* (2016.01)
*H01H 33/59* (2006.01)

(52) U.S. Cl.
CPC ............ *H02J 5/00* (2013.01); *H01H 33/596* (2013.01)

(58) Field of Classification Search
CPC ................................ H02J 5/00; H01H 33/596
USPC ..................................................... 307/18–29
See application file for complete search history.

(56) References Cited

U.S. PATENT DOCUMENTS

| | | | |
|---|---|---|---|
| 8,351,233 | B2 | 1/2013 | Bernhard et al. |
| 8,717,716 | B2 | 5/2014 | Haefner et al. |
| 2011/0205771 | A1 | 8/2011 | Bernhard et al. |
| 2011/0235375 | A1 | 9/2011 | Dommaschk et al. |
| 2013/0278078 | A1 | 10/2013 | Ohlsson et al. |

FOREIGN PATENT DOCUMENTS

| | | | | |
|---|---|---|---|---|
| CN | 102067406 | A | 5/2011 | |
| CN | 102138264 | A | 7/2011 | |
| DE | 1173163 | B | 7/1964 | |
| EP | 2469552 | A2 | 6/2012 | |
| GB | 1044474 | A * | 9/1966 | ........... H01H 33/596 |
| RU | 2375779 | C1 | 12/2009 | |
| WO | 2009152840 | A1 | 12/2009 | |
| WO | 2011057675 | A1 | 5/2011 | |
| WO | WO 2012084693 | A1 * | 6/2012 | ............. H01H 9/548 |
| WO | 2012116738 | A1 | 9/2012 | |

* cited by examiner

*Primary Examiner* — Thomas Skibinski
(74) *Attorney, Agent, or Firm* — Laurence Greenberg; Werner Stemer; Ralph Locher

(57) ABSTRACT

A method for switching an operating current in a meshed DC voltage network enables operating currents in a DC voltage network to be switched economically in both directions. At least one converter connected to the DC voltage network is controlled in such a way that a zero current is generated in a switching branch having a mechanical switch and the mechanical switch is actuated in accordance with the generated zero current.

4 Claims, 3 Drawing Sheets

METHOD FOR SWITCHING AN OPERATING CURRENT

BACKGROUND OF THE INVENTION

Field of the Invention

The invention relates to a method for switching an operating current in a meshed DC voltage network.

The application of DC voltage power switches is essential for the implementation of future DC voltage networks.

A DC voltage power switch is proposed in WO 2011/057675 A1 that implements a hybrid switch concept. The DC voltage power switch disclosed therein thus comprises a mechanical switch in series with an electronic auxiliary switch. This series connection is bridged by an electronic power switch unit that is able to switch large powers off safely. A large number of power semiconductor switches are connected in series for this purpose, which makes the known DC voltage power switch complex and expensive.

In order to reduce costs, it has already been proposed to design the DC voltage power switch such that while it does indeed carry currents in both directions, it can only switch in one direction. Such a unidirectional switch would be significantly more economical than a comparable bidirectional switch. For switching off DC voltage fault currents a unidirectional switch is often sufficient. Operating currents occur, however, in both current directions so that a bidirectional switch is required.

Switching DC currents with a mechanical switch is known from practice, wherein an oscillating circuit connected in parallel to the mechanical switch creates a zero current crossover in the mechanical switch, so that an arc struck between the contacts of the mechanical switch is extinguished.

BRIEF SUMMARY OF THE INVENTION

The object of the invention is to provide a method of the type referred to at the beginning, with which an operating current can be safely and economically switched off in both directions.

The invention achieves this object through a method for switching an operating current in a meshed DC voltage network, that connects converters, each of which is connected to an AC voltage network, together on their DC voltage sides, wherein each converter is set up to transmit electrical power between the AC voltage network and the DC voltage network to which it is connected, and wherein the DC voltage network comprises a switching branch in which a mechanical switch is arranged, in which at least one converter is regulated such that a zero current crossover is generated in the switching branch, and the mechanical switch is actuated depending on the zero current crossover that is generated.

The invention starts from the assumption that a separate DC voltage power switch is arranged in the DC voltage network for switching off high DC voltage fault currents. This can be designed as a unidirectional switch, so that fault currents can only be switched off in one direction. The invention is based on the idea that artificially generated zero current crossovers do not necessarily have to be generated with the aid of a parallel oscillating circuit in a mechanical switch. Rather it is sufficient, in the context of the invention, if a zero current crossover is generated with the aid of the converter that is connected, in any case, to the DC voltage network. In fact it is hard to imagine that in a meshed DC voltage network of any desired size, to which converters from different manufacturers are connected, it will be possible to control the operating current in any desired line with sufficient precision, for example of +/−10 A, or even more precisely. It is true that each individual current converter can be controlled with sufficient precision. However, due to the meshed structure of the DC voltage network, a plurality of controllers and various disturbing variables act simultaneously on the current in this mesh, so that continuous variations of the true value must be expected. According to the invention it is therefore proposed that artificial zero current crossovers are generated instead of continuously regulating the current in the switching branch to zero over a long period of time. In the context of the invention it is sufficient to control the current of a line with a tolerance of for example +/−50 A. In this way a nominal curve that forces zero current crossovers can be specified for the current. If this zero current crossover is generated in the switching branch in which the mechanical switch is arranged, the switch can be actuated such that its contacts are opened sufficiently far at the moment of the zero current crossover that an arc is extinguished. Since no times need to be observed when switching operating or load currents, such a switching process can occur slowly in the context of the invention.

According to an embodiment that is expedient in this respect, the actuation of the mechanical switch is performed before reaching the zero current crossover. When the contacts of the mechanical switch are separated, first an arc is struck until it is extinguished at the moment of the zero current crossover. At that moment in time, however, the contacts have reached such a distance apart from each other that the necessary resistance to voltage is supplied, and a new arc cannot develop between the contacts of the mechanical switch.

An accurate synchronization between the regulation of the converter or converters and the initiation of the switching process is of course necessary in the presentations so far.

In order to obtain somewhat more of a margin here, according to an expedient development of the invention, at least one power semiconductor switch is provided, connected in series with the mechanical switch in the switching branch, said switch being held continuously in normal operation in its conductive state, and being transferred into its blocking state to switch off the operating current. As has already been explained, very good synchronization between the opening of the mechanical switch and the time of the zero current crossover is necessary without such a power semiconductor switch. Otherwise an arc continues between the contact elements of the mechanical switch for a very long time, or else the zero current crossover takes place at a moment in time in which the mechanical switch is not yet open. For this reason at least one power semiconductor switch is expedient. Power semiconductor switches that can be switched off, such as IGBTs, IGCTs or GTOs, with parallel freewheeling diodes in opposite polarities, may be considered for the power semiconductor switch. Preferably, however, a thyristor is employed as a power semiconductor switch. The thyristor is, for example, a thyristor that can be triggered by light. In order to keep the thyristor in its conductive state, in which a flow of current through the thyristor is made possible, it is triggered continuously. Due to the permanent triggering of the thyristor, the load current passes in normal operation through said thyristor and through the mechanical switch that is arranged in series with it. If an operating or load current is to be switched off, the trigger commands are stopped. At a zero current crossover, the thyristor turns off, and it must be ensured here that a sufficiently long rest period is provided to the thyristor, so that it can reliably transfer into its blocking state. In the blocking state, the thyristor is not conductive, so that the mechanical switch that is arranged in series with it can be opened at zero current.

If it is desired to use this kind of load current or operating current switch-off for both current directions, it is necessary to connect a second power semiconductor switch, e.g. a second thyristor, in parallel with the first thyristor but with the opposite polarity. Both thyristors are arranged in series with the mechanical switch. Since a mechanical switch which performs the voltage insulation is arranged in series with the thyristor, the thyristors only have to be designed for a low voltage. An insulating capacity of, for example, a few kilovolts is adequate here. For reasons of redundancy, however, it is advantageous for a plurality of thyristor disks to be connected in series. For example, three thyristor disks are connected in series. According to a development that is expedient in this respect, an arrester is provided in parallel with the thyristor or thyristors and limits the maximum voltage across the thyristors. The arrester is designed such that only very little current flows at the usual voltages when an operating current is switched off.

Measuring sensors expediently detect the switching current flowing in the switching branch and the regulation of the converter or converters is performed depending on the detected switching current. In this way the temporal sequence between the regulation of the converter or converters and the output of the switching command can be expediently adjusted.

According to one advantageous development, the zero current crossover is caused by a voltage drop that is generated at the DC voltage terminal of at least one converter. According to this advantageous development the converter is preferably a converter that can impress a voltage, therefore known as a voltage source converter (VSC), at the DC voltage output of which the DC voltage desired at the time is generated. If this output voltage changes suddenly, this leads to a voltage drop that can provide the required zero current crossover. Said converter can, however, also be an externally controlled converter in the context of the invention.

According to a development expedient in this respect, a first voltage drop is induced by at least one converter, after which the curve of the switching current flowing in the switching branch is detected and evaluated, wherein then a second voltage drop is induced by the same converter or converters whose magnitude is determined depending on the evaluation of the curve of the switching current. If a zero current crossover is not induced by the first specified drop-in voltage, this can be determined from the current measured in the switching branch. A larger drop-in voltage in the form of a second voltage drop can then be generated. In this way, with the help of the first voltage drop acting as a test-firing, the effect of a voltage drop on the switching branch can be tested. The second voltage drop is then controlled on the basis of the results of the first voltage drop.

According to the present invention, operating currents can be switched with comparatively little difficulty in both directions. According to the invention it is sufficient to install a mechanical switch that can withstand an arc into a DC voltage network. More complex switch concepts are unnecessary in the context of the invention. If thyristors are connected in series with the mechanical switch, these can, for example, be triggered by light. A complex power supply for the thyristors at a high voltage potential is unnecessary.

BRIEF DESCRIPTION OF THE SEVERAL VIEWS OF THE DRAWING

Further expedient embodiments and advantages of the invention are the object of the following description of exemplary embodiments of the invention with reference to the figures of the drawing, wherein the same reference signs refer to components that have the same effect, and wherein FIG. 1 schematically shows a meshed DC voltage network.

DESCRIPTION OF THE INVENTION

Figure 1:
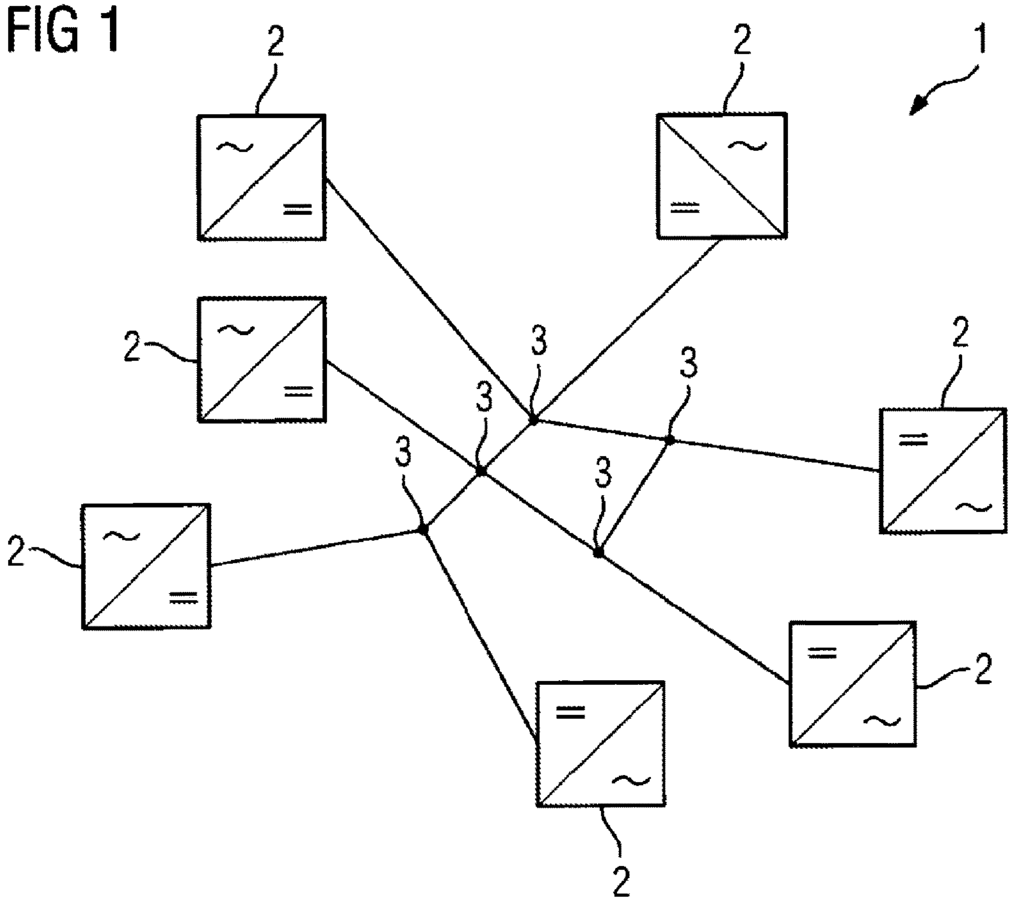

FIG. 1 shows an exemplary embodiment of a DC voltage network 1. The DC voltage network 1 connects converters 2 together on the DC voltage side. The DC voltage network here forms network nodes 3. In the DC voltage network 1, DC voltage power switches, not shown in the figure, are arranged, being capable of switching fault currents in one direction. Only mechanical switches are provided for switching operating currents, and these also are not shown in FIG. 1. Each converter is connected to an AC voltage network not shown in the figure.

Figure 2:
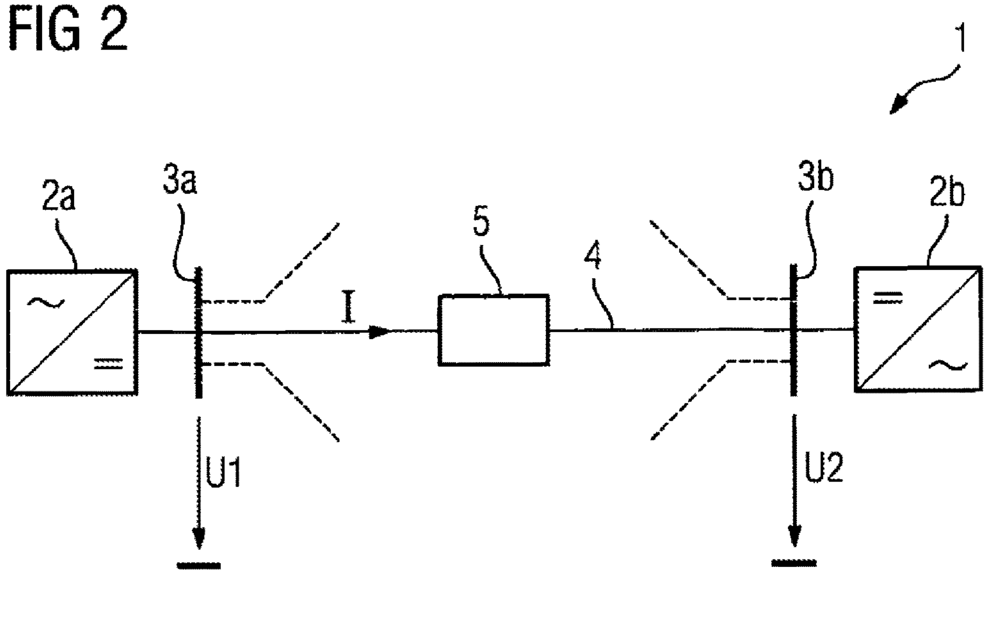
FIG. 2 shows a switching branch of the DC voltage network according to FIG. 1 with a mechanical switch.

FIG. 2 shows an enlarged section of the DC voltage network 3 according to FIG. 1. A switching branch 4 can be seen here, in which a mechanical switching unit 5 is arranged. The mechanical switching unit 5 comprises a mechanical switch along with thyristors arranged in series with it as power semiconductor switches. The switching branch 4 extends between two DC voltage network nodes 3*a* and 3*b*, each of which is connected directly to the converter 2*a* and 2*b* respectively. It should be noted at this point that, in the figures of the drawing, the DC voltage network 1 is only illustrated as a single-pole network. This is, however, only for the purposes of clarity. The DC voltage network expediently comprises in the context of the invention two oppositely polarized lines, for example a positive pole and a negative pole.

The voltage at the first DC voltage network node 3*a* is largely determined by the output voltage on the DC voltage side of the converter 2*a*, while the voltage at the second DC voltage network node 3*b* is largely determined by the voltage output of the second converter 2*b*. In normal operation, the voltage drop U1 at the first network node 3*a* with respect to ground potential is somewhat larger than the corresponding voltage U2 at the second DC voltage network node 3*b*. The current I thus flows in the direction shown in FIG. 2 from the first DC voltage network node 3*a* to the second DC voltage network node 3*b* through the switching unit 5. If now a voltage drop is generated by the converter regulation, not shown in the figure, of the first converter 2*a* at the DC voltage output of the converter 2*a*, the voltage U1 at the first DC voltage network node drops. If this voltage drop is large enough, it results in a zero current crossover.

Figure 3:
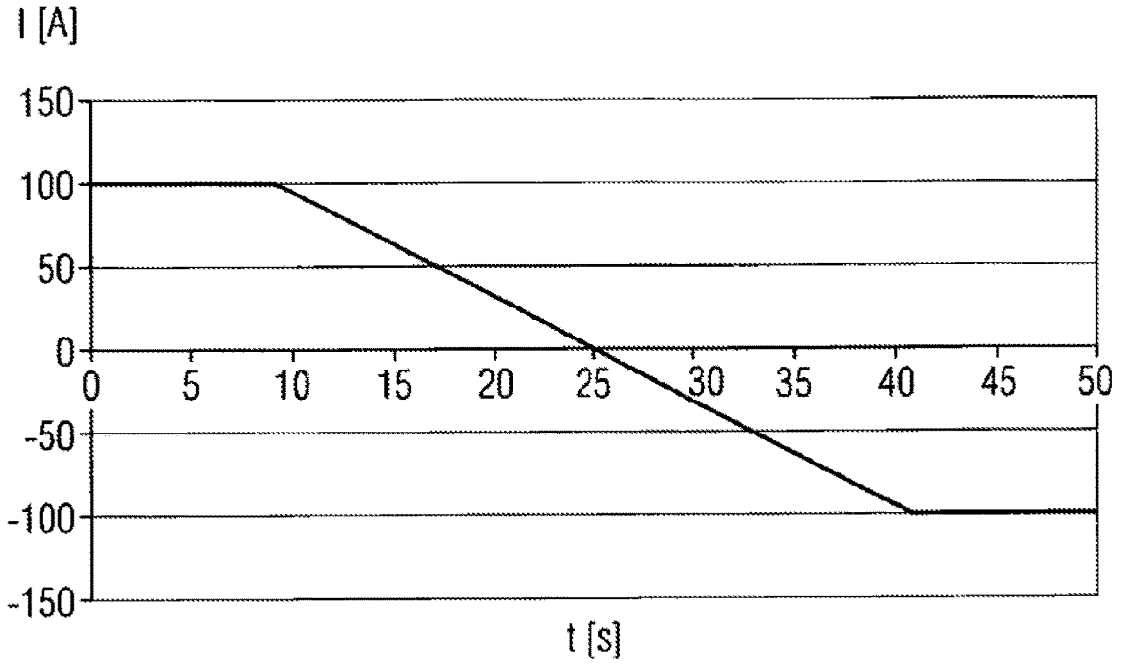
FIG. 3 shows an idealized current curve for a zero current crossover in the switching branch according to FIG. 2.

FIG. 3 shows by way of an example an idealized zero current crossover. At time point 0 the operating conditions U1 and U2, usual in normal operation, are present, and the current flows in the direction shown in FIG. 2. After 10 seconds, the voltage drop is initiated by the first converter 2*a*. After 25 seconds a zero current crossover, with a flow of current in the opposite direction then occurs.

Figure 4:
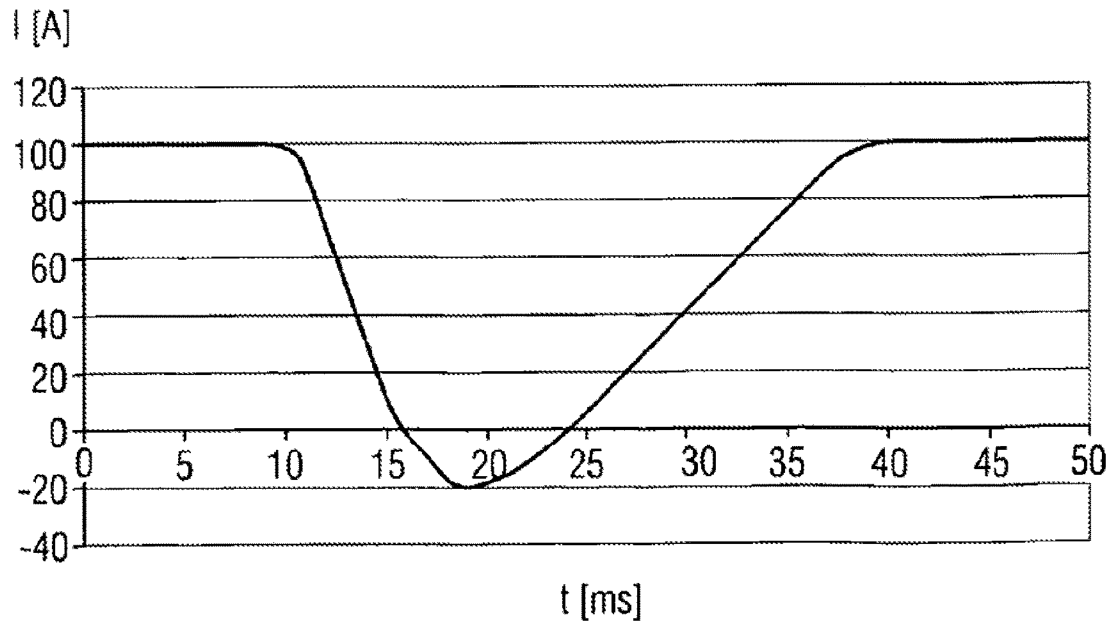
FIG. 4 shows a realistic current curve for the generation of a zero current crossover in the switching branch according to FIG. 2
Figure 5:
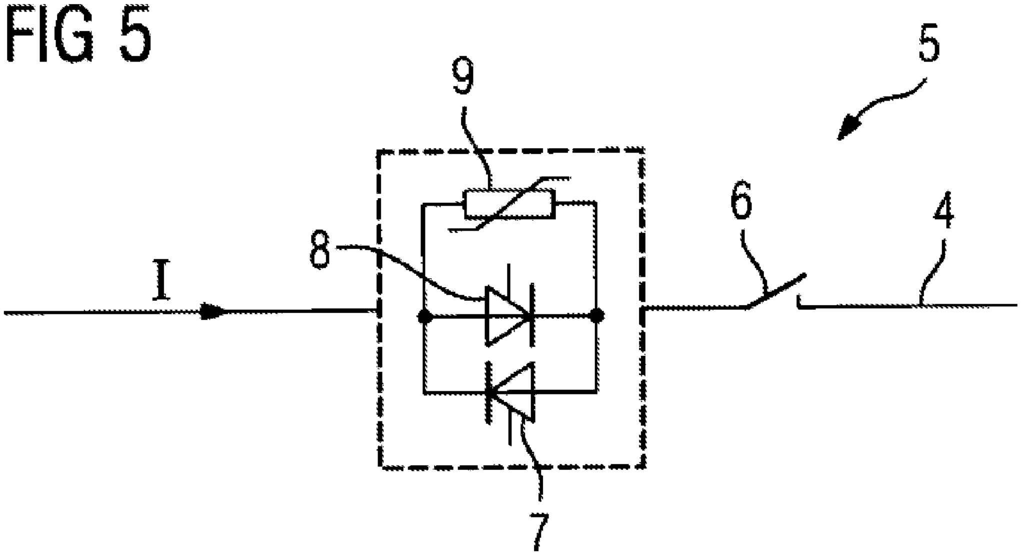
FIG. 5 shows the mechanical switch as well as the switch-off branch in more detail.

FIG. 4 shows a more realistic current curve, wherein it is assumed that the voltage drop of the first converter 2*a* only occurs for a short period of time, so that then the first converter 2*a* can again be operated with normal operating parameters. As a result there are two zero current crossovers after about 16 and 24 milliseconds. If the mechanical switch of the switching unit 5 is triggered at, for example, time point 0, then after 16 milliseconds an arc between its switching contacts is extinguished, as they have reached such a large distance from each other that a sufficiently high voltage resistance is provided, and re-ignition of the arc is avoided. FIG. 5 shows a preferred embodiment of the switching unit 5, wherein it can be seen that the switching unit 5 comprises a mechanical switch 6 and two thyristors 7 and 8 connected in series with it as power semiconductor switches, which are connected in parallel with one another with opposite polarities. An arrester 9 is connected in parallel with the two thyristors 7, 8. The two thyristors 7 and 8 are continuously triggered in normal operation, so that an operating current can flow in both directions through the thyristors 7 and 8 and the mechanical switch 6. In the case illustrated in FIG. 5, the operating current I flows from left to right and thus through the thyristor 8 as well as then through the mechanical switch 6.

A zero current crossover is generated in order to switch off the operating current I. The continuous triggering of the thyristor 8 is suppressed. If the current I flowing through the thyristor 8 falls below its holding current, the thyristor 8 changes into its blocking state. A flow of current through the thyristor 8, and of course also through the thyristor 7, in the direction shown is thus no longer possible. The mechanical switch 6 can now be opened with zero current. The arrester 9 serves to protect the thyristors 7 and 8 from overvoltage. As a result of the serial arrangement of the thyristors 7, 8 and of the mechanical switch 6, it is possible to make use of a less precise synchronization between the actuation of the mechanical switch 6 and the voltage drop induced by the regulation of the converter 2.

The invention claimed is:

1. A method for switching an operating current in a meshed DC voltage network, the method comprising the following steps:
- connecting converters to respective AC voltage networks;
- connecting the converters together on their DC voltage sides using the meshed DC voltage network;
- transmitting electrical power using each converter between the AC voltage network to which it is connected and the DC voltage network;
- providing the DC voltage network with a switching branch having a mechanical switch;
- regulating at least one of the converters to generate a zero current crossover in the switching branch;
- actuating the mechanical switch in dependence on the generated zero current crossover;
- causing the zero current crossover by a voltage drop generated at a DC voltage terminal of at least one of the converters;
- inducing a first voltage drop by using at least one of the converters and subsequently detecting and evaluating a curve of a switching current flowing in the switching branch; and
- then inducing a second voltage drop using the same at least one of the converters having a magnitude determined in dependence on the evaluation of the curve of the switching current.

2. The method according to claim 1, which further comprises carrying out the step of actuating the mechanical switch before reaching the zero current crossover.

3. The method according to claim 1, which further comprises:
- connecting at least one power semiconductor switch in series with the mechanical switch in the switching branch;
- holding the at least one power semiconductor switch in normal operation continuously in its conductive state; and
- transferring the at least one power semiconductor switch into its non-conducting blocking state to switch an operating current of the power semiconductor switch.

4. The method according to claim 1, which further comprises:
- detecting a switching current flowing in the switching branch by using measuring sensors; and
- carrying out the step of regulating at least one of the converters in dependence on the detected switching current.

* * * * *